(12) United States Patent
Kopf et al.

(10) Patent No.: US 7,924,902 B2
(45) Date of Patent: Apr. 12, 2011

(54) HIGHLY REPETITIVE LASER SYSTEM HAVING A COMPACT DESIGN

(75) Inventors: Daniel Kopf, Altach (AT); Maximilian Josef Lederer, Alberschwende (AT)

(73) Assignee: High Q Laser Production GmbH, Hohenems (AT)

( * ) Notice: Subject to any disclaimer, the term of this patent is extended or adjusted under 35 U.S.C. 154(b) by 217 days.

(21) Appl. No.: 10/578,508

(22) PCT Filed: Nov. 25, 2004

(86) PCT No.: PCT/EP2004/013375
§ 371 (c)(1),
(2), (4) Date: Sep. 26, 2006

(87) PCT Pub. No.: WO2005/053118
PCT Pub. Date: Jun. 9, 2005

(65) Prior Publication Data
US 2007/0053401 A1    Mar. 8, 2007

Related U.S. Application Data

(60) Provisional application No. 60/525,178, filed on Nov. 28, 2003.

(51) Int. Cl.
*H01S 3/081* (2006.01)
(52) U.S. Cl. ............ 372/93; 372/12; 372/18; 372/25; 372/70; 372/92; 372/102; 372/700
(58) Field of Classification Search .......... 372/70, 372/92, 93, 700, 12, 18, 25, 99, 102
See application file for complete search history.

(56) References Cited

U.S. PATENT DOCUMENTS

| 5,079,772 A | * | 1/1992 | Negus et al. | 372/18 |
| 5,163,059 A | * | 11/1992 | Negus et al. | 372/18 |
| 5,212,698 A | * | 5/1993 | Kafka et al. | 372/18 |
| 5,353,291 A | * | 10/1994 | Sprangle et al. | 372/5 |
| 5,799,025 A | * | 8/1998 | Lai et al. | 372/18 |
| 5,815,519 A | * | 9/1998 | Aoshima et al. | 372/25 |
| 5,953,354 A | * | 9/1999 | Staver et al. | 372/18 |

(Continued)

FOREIGN PATENT DOCUMENTS

DE    100 63 976 A1    7/2002

(Continued)

OTHER PUBLICATIONS

M. Hentschel et al "Generation of 0.1-TW optical pulses with a single-stage Ti:sapphire amplifier at a 1-kHz repetition rate" Appl. Phys. B 70 [Suppl.], S161-S164 2000.*

(Continued)

*Primary Examiner* — Minsun Harvey
*Assistant Examiner* — Yuanda Zhang
(74) *Attorney, Agent, or Firm* — Oliff & Berridge, PLC

(57) ABSTRACT

The invention relates to a highly repetitive laser system operating according to the reproducible amplifier principle. Said system comprises at least one amplified laser medium, a laser resonator provided with at least one resonator mirror and at least one modulator and a pump source, in particular, a laser diode source, which is used to pump the laser medium. The highly repetitive laser system is compact by virtue of the fact that a pulse extensor, having a highly dispersive effect as a result of the structure or material thereof, is integrated into the laser resonator.

17 Claims, 5 Drawing Sheets

U.S. PATENT DOCUMENTS

| | | | | |
|---|---|---|---|---|
| 6,150,630 | A | * | 11/2000 | Perry et al. ............... 219/121.68 |
| 6,594,301 | B2 | * | 7/2003 | Pang ............................. 372/100 |
| 2002/0149836 | A1 | * | 10/2002 | Jovanovic et al. ............ 359/328 |
| 2003/0095320 | A1 | | 5/2003 | Pang |

FOREIGN PATENT DOCUMENTS

WO    WO 2004/107513 A2    12/2004

OTHER PUBLICATIONS

H. Takada et al "Large-ratio stretch and recompression of sub-10-fs pulse utilizing dispersion managed devices and a spatial light modulator", Appl. Phys. B 74 [Suppl.], S253-S257 2002.*

Kopf et al., U.S. Appl. No. 60/474,250, filed May 30, 2003.

Kopf et al., U.S. Appl. No. 60/442,917, filed Jan. 28, 2003.

Maurice Pessot et al., "Chirped Pulse Amplification of 300 fs Pulses in an Alexandrite Regenerative Amplifier," IEEE, Journal of Quantum Electronics, vol. 25, No. 1, Jan. 1989, pp. 61-66.

T. B. Norris, "Femtosecond pulse amplification at 250 kHz with a Ti:sapphire regenerative amplifier and application to continuum generation," Optics Letter, Jul. 15, 1992, No. 14, New York, NY, pp. 1009-1011.

Taiha Joo et al., "Ti:sapphire regenerative amplifier for ultrashort high-power multikilohertz pulses without an external stretcher," Feb. 15, 1995, vol. 20, No. 4, Optics Letter, pp. 389-391.

Hsiao-hua Liu et al., "Directly diode-pumped Yb:KY(WO$_4$)$_2$ regenerative amplifiers," Optics Letters, vol. 27, No. 9, May 1, 2002.

Guanghua Cheng et al., "A compact Ti:sapphire femtosecond pulse amplifier without stretcher at high repetition rate," Chinese Optics Letter, Apr. 20, 2003, vol. 1, No. 4., pp. 225-227.

Agarwal, "Nonlinear Fiber Optics," Academic Press 1989, p. 150.

\* cited by examiner

HIGHLY REPETITIVE LASER SYSTEM HAVING A COMPACT DESIGN

The invention relates to a highly repetitive laser system having a compact design according to the precharacterizing clause of claim 1.

For many applications, such as, for example, in biomedicine or material processing, high intensities of laser pulses are required. With good beam quality (M2<1.2) and sub-500 fs pulses, this means as a rule pulse energies in the range of 1-10 µJ, in order to surpass the typical ablation or processing threshold energy densities and to permit an efficient process.

In the area of material processing, the writing of arbitrary and very precisely formed waveguides in glass or plastic represents an example of use, this technology being of considerable importance for the future telecommunication networks.

Owing to the short and efficient energy introduction (mainly through multiphoton absorption) secondary effects of a thermomechanical type tend to be negligible in the case of femtosecond pulses. This, together with focusing, leads to the diffraction limit, to the precision mentioned and—in the case of medical applications—also to freedom from pain. If the threshold energy density is reached, it is furthermore important that the process can be realised with relatively high repetition rates in order to increase the processing speed.

Laser devices to date, in particular those with regenerative amplifiers or with chirped pulse regenerative amplification (CPA) achieve the necessary energy but are often limited by the size of the required pulse stretcher/compressor unit. Often, as in the case of Ti:sapphire systems the necessity of an expensive and bulky pump laser is an additional aspect. Furthermore, such systems have been realised to date generally only with repetition rates of, typically, 10-20 kHz. Moreover the external components especially in the pulse stretcher, result in a greater complexity and increased effort for the adjustment.

Laser systems comprising a regenerative amplifier according to the principle of chirped pulse amplification are disclosed, for example in US 2003/0095320, and in M. Pessot et al. "Chirped Pulse Amplification of a 300 fs Pulse in an Alexandrite Regenerative Amplifier", IEEE J. Quantum Electron., QE-19, pages 61-66, 1989, or H. Liu et al., "Directly diode-pumped Yb:KY(WO$_4$)$_2$ regenerative amplifiers", Opt. Lett. Vol. 27, pages 722-724, 2002. These documents are considered as being incorporated into this Application by reference.

Greater compactness of the design can be achieved in the case of systems of lower pulse energy by dispensing with a pulse stretcher for stretching seed pulses before input into the regenerative amplifier. The effect of pulse stretching is brought about in such applications by the components of a regenerative amplifier which are in any case generically present, such as, for example, by amplifier medium, Pockels cell, quarter-wave plate or thin-film polarizer.

Such a laser system of the prior art without external pulse stretcher is disclosed, for example, in "A compact Ti:sapphire femtosecond pulse amplifier without stretcher at high repetition rate", Guanghua Cheng, Lianjun Yu, Yishan Wang, Qing Liu, Guofu Chen, Wie Zhao, Chinese Optics Letters, vol. 1, no. 4, 20 Apr. 2003, pages 225-227, this document being considered as being incorporated into this Application by reference. In this arrangement comprising a Ti:sapphire as the laser medium, a specially formed pulse stretcher is dispensed with, the necessary pulse stretching being effected by the dispersive influences of the system components of the cavity of the regenerative amplifier. Subsequent compression is brought about by two pairs of prisms. A seed pulse of less than 80 fs duration is stretched to a total of 2.13 ps during all cycles. The stated pulse power is 100 µJ. For avoiding damage to the laser medium during the amplification phase of seed pulses, the sapphire crystal is placed outside the focus of the confocal cavity, so that no damage occurs even at high pump powers. However, owing to the lack of amplification in the case of cw pumps, this leads to the necessity of pumping the amplifier in a pulsed manner, which in turn results in low repetition rates (~1 kHz).

A similar arrangement is described in "Femtosecond pulse amplification at 250 kHz with a Ti:sapphire regenerative amplifier and application to continuum generation", T. B. Norris, Optics Letters, vol. 17, no. 14, 15 Jul. 1992, pages 1009-1011, this document being considered as being incorporated into this Application by reference. In order to achieve pulses having a power of 1.7 µJ, seed pulses are stretched to about 10 ps during the cycles in the cavity by the dispersion of the system components. For compression, a sequence of 6 prisms is used. In this system, too, there is the necessity for a complicated, bulky and expensive pump laser system. In addition, two acousto-optical modulators have to be used for switching the amplifier.

In "Ti:sapphire regenerative amplifier for ultrashort high-power multikilohertz pulses without an external stretcher", Taiha Joo, Yiwei Jia, Graham R. Fleming, Optics Letters, vol. 20, no. 4, 15 Feb. 1995, pages 389-391, the use of two pairs of prisms comprising flint glass inside the cavity is described, which pairs of prisms stretch a seed path to about 20 ps, this document being considered as being incorporated into this application by reference. Consequently, pulses having a repetition rate up to 5 kHz and having an energy of 50 µJ per pulse are achieved. For compression, two pairs of prisms are used. In this arrangement, the effect of an external pulse stretcher of great length is therefore replaced by the repeated passage of a pulse stretcher of the same type inside the cavity. However, the use of a pair of prisms inside the cavity prevents a further increase in the compactness of the amplifier.

The laser arrangements of the generic type of the prior art are limited with regard to the achievable pulse stretching by the material dispersion of the system components or do not permit sufficient compactness owing to their design with internal prisms.

Moreover, the chosen design in the case of pulse-pumped systems is favoured by the laser medium Ti:sapphire used. Owing to the large effective cross-section of Ti:sapphire, the beam cross-section can be kept large for achieving the necessary amplification factor, excessively high intensities and hence material damage being avoided. Thus, the pulse stretching produced by the system components is also sufficient for remaining below the critical intensity threshold. In addition, owing to the large emission bandwidth of Ti:sapphire, the dispersive pulse stretching is inhibited only minimally by the amplification filtering. However, the dispersion remains dependent on system components and can be influenced only to a slight extent. For other materials having a smaller effective cross-section, such as, for example, Yb-doped laser media, these construction possibilities are no longer applicable. Owing to the smaller effective cross-section, the beam cross-section must be more strongly focussed so that much greater stretching of the pulse is required for avoiding self-focusing or the pulse energy must remain typically less than several 10 µJ. The laser arrangements realised in the prior art thus constitute solutions which can be realised in this form especially for the laser medium Ti:sapphire or similar materials or, when realised with other, for example Yb-doped, laser media, would lead to said problems, such as poor compactness or high complexity.

An object of the present invention is to extend the range of usable laser media for laser systems of the generic type as diode-pumped regenerative amplifiers having a compact design.

A further object is to provide a laser system which produces laser pulses in the micro-joule range with a duration shorter than 400 fs and a repetition rate greater than 50 kHz and with a compact design.

A further object of the present invention is the provision of a laser system which has no dynamic instabilities in this range.

A further object is to reduce the complexity of laser systems of the generic type as regenerative amplifiers.

These objects are achieved by the subjects of Claim 1 or of the dependent Claims or the solutions are further developed.

The invention relates to a highly repetitive, compact laser system according to the principle of the regenerative amplifier, in which an external pulse stretcher for pulse stretching can be dispensed with and which, together with the use of laser media beyond Ti:sapphire, permits new freedom in the design of laser systems.

According to the invention, broadband laser amplifier media which have a relatively long storage time, e.g. greater than 1 ms, are used. Yb:glass or various Yb:crystals which can be diode-pumped so that compact arrangements can be realised may be mentioned as an example of this. Typically, such materials have a very small stimulated effective cross-section $(0.1 \ldots 5e{-}20\,cm^2)$, which however, owing to the long storage time, can nevertheless lead to acceptable gain values, which is the case especially for pump sources having high brilliance.

For inputting seed pulses into the regenerative amplifier, it is possible to use an fs pulse oscillator which is as compact as possible and which provides suitably short seed pulses and, with regard to the wavelength, corresponds to the active transition in the amplifier medium. A suitable pulse duration is, for example, $\tau_{FWHM} < 250$ fs.

An electro-optical switching element which permits repetition rates of more than 50 kHz can be used as a driver. In contrast to arrangements having acousto-optical modulators a single element is sufficient with the use of electro-optical modulators, so that a more compact design is possible.

A diode pump source of high brilliance is preferably suitable for pumping the laser medium.

Pulse stretching and subsequent compression are effected by components tailored to one another, but the material-related dispersion of the other system components can also be used or can be included in the design of the system. A component which is especially designed for this purpose and has a dispersive effect and whose parameters permit a compact laser system design according to the invention is used as a pulse stretcher inside the cavity. Suitable components are, for example, dispersive mirrors or blocks of highly dispersive media, such as, for example, SF57 glass. An advantageous ratio of the $2^{nd}$ order (positive) dispersion to the $3^{rd}$ order (positive) dispersion should be achieved, i.e. a minimum $3^{rd}$ order dispersion in combination with maximum $2^{nd}$ order dispersion.

The compressor designed with regard to the intra-cavity pulse stretcher can advantageously be formed with the use of a dispersive grating having a relatively small number of lines, e.g. less than 1700 lines/mm, or even less than 1200 lines/mm, so that here too a minimum positive $3^{rd}$ order dispersion can be realised. On the other hand, the desire for compactness determines that the number of lines should not be chosen to be too small.

The laser system is based in its function on the chirped pulse amplification (CPA) principle, which, however, is modified or further developed in some respects.

In contrast to the standard CPA, the seed pulse is not broadened by means of an external grating pulse stretcher, e.g. according to Martinez, but is input into the regenerative amplifier as an fs pulse or as a ps pulse with a duration of a few 10 picoseconds. According to the invention slight stretching can therefore be achieved outside the cavity, for example by a block of dispersive material, but complete stretching does not take place outside the cavity. On the other hand, the initially short or maximally prestretched pulse is then broadened with each cycle within the cavity by means of a highly dispersive element, such as, for example, a block of dispersive material or a mirror arrangement. As a result of this, a negligible B-integral is accumulated with not excessively high final energies, e.g. <30 µJ, and destruction or pulse broadening by self-phase modulation (SPM) does not occur.

After accomplished, in particular complete, amplification or all cycles in the cavity, the typical pulse widths are then several 10 ps. This applies typically to transformation-limited seed pulses of 150 fs duration, the stretching factor due to the additional highly dispersive elements in the resonator being 3-10 times greater than with exclusively native components.

A high pump diode brilliance leads to a relatively high amplification factor per cycle (e.g. small-signal gain $G_0 = 1.2 \ldots 1.3$) in the regenerative amplifier. In addition, this is saturated in the quasi-cw mode at relatively high gain values due to the high repetition rate and long inversion lifetime and small stimulated effective cross-section. This is achieved by choosing as small a number of cycles as possible, typically less than 100 cycles, in order to achieve the required pulse energies. In a system design having too high a gain value, the number of cycles may on the other hand be too low at a given final energy, which may lead to the destruction of the laser medium since the amplified pulse is still too short owing to a lack of dispersive broadening.

On the other hand, a minimum number of cycles in the amplifier guarantees that the uncompensated $3^{rd}$ order dispersion, e.g. positive dispersion with a combination of highly dispersive glass block and grating compressor, remains minimum and, after compression, the minimum pulse width is limited only slightly by $3^{rd}$ order dispersion. Not least, a very compact compressor can also be realised by the minimised influences of only a small number of cycles.

The choice of a laser medium suitable according to the invention and having a long inversion lifetime moreover has the advantage that, at the desired repetition rate, the amplifier can be operated in a stable manner and true to the actuation frequency in a single possible initial energy state, this being independent of the chosen number of cycles.

The material dispersion inside a cavity with an element of optical glass of the type SF57 (e.g. from Schott) is as a rule dominated by this glass and is obtained, for example, according to:

$$\beta_2(\lambda) = 2 \frac{\lambda^3 \cdot l_{mat}}{2\pi c^2} \cdot \frac{d^2 n(\lambda)}{d\lambda^2} \tag{1}$$

$$\beta_3(\lambda) = 2 \frac{\lambda^4 \cdot l_{mat}}{4\pi^2 c^3} \cdot \left( 3 \cdot \frac{d^2 n(\lambda)}{d\lambda^2} \cdot \lambda \cdot \frac{d^3 n(\lambda)}{d\lambda^3} \right) \tag{2}$$

$$n(\lambda) = \sqrt{1 + \frac{B_1 \cdot \lambda^2}{\lambda^2 - C_1} + \frac{B_2 \cdot \lambda^2}{\lambda^2 - C_2} + \frac{B_3 \cdot \lambda^2}{\lambda^2 - C_3}} \tag{3}$$

-continued $$B_1 = 1.81651371$$
$$B_2 = 4.28893641 \cdot 10^{-1}$$
$$B_3 = 1.07186278$$
$$C_1 = 1.43704198 \cdot 10^{-2}$$
$$C_2 = 5.92801172 \cdot 10^{-2}$$
$$C_3 = 1.21419942 \cdot 10^{2}$$
(4)

For example, for a 50 mm long block of an SF57 in which in each case the radiation is input and output while maintaining the Brewster condition, the following therefore follows:

$$\beta_2/\text{cycle} = 15174 fs^2$$ (5)

$$\beta_3/\text{cycle} = 12682 fs^3$$

$$\frac{\beta_2}{\beta_3} = 1.196 fs^{-1}$$

$$T_{int} = 0.996/50 \text{ mm, internal transmission}$$

For other glass types, the following values are accordingly obtained:

- SF10 (6)

$$\beta_2/\text{cycle} = 11408 fs^2$$
$$\beta_3/\text{cycle} = 10462 fs^3$$
$$\frac{\beta_2}{\beta_3} = 1.09 fs^{-1}$$
$$T_{int} = 0.994/50 \text{ mm, internal transmission}$$

- BK7 (7)

$$\beta_2/\text{cycle} = 2428 fs^2$$
$$\beta_3/\text{cycle} = 2634 fs^3$$
$$\frac{\beta_2}{\beta_3} = 0.524 fs^{-1}$$
$$T_{int} = 0.996/50 \text{ mm, internal transmission}$$

From the dispersion effected by the dispersive element, there follows a stretching of a $\text{sech}^2(1.763 \cdot t/\tau_{FWHM})$ seed pulse with $\tau_{FWHM}=150$ fs inside the cavity, according to:

$$\Delta \tau/\text{cycle} \cong \beta_2/\text{cycle} \cdot \Delta v \cdot 2\pi$$ (8)

$$= \beta_2/\text{cycle} \cdot \frac{2\pi \cdot 0.315}{\tau_{FWHM}}$$

$$= 15174 fs^2 \cdot \frac{2\pi \cdot 0.315}{150 fs}$$

$$= 200 fs$$

In addition, the further components of the cavity, such as, for example, Pockels cell, laser medium, quarter-wave plate or polarizer, result in additional dispersive fractions of, typically, about 4000 fs² resulting altogether in a dispersion per cycle of $$\beta_2^{total}/\text{cycle} \cong 20000 \text{ fs}^2$$ (9)

If the amplifier filtering, in this case that counteracting the dispersive broadening, is neglected a total pulse stretching of $$\Delta \tau_{80} = 80 \cdot 20000 fs^2 \cdot \frac{2\pi \cdot 0.315}{150 fs} = 21.1 \text{ ps}$$ (10)

is achieved after 80 cycles. In comparison, a dispersion of about 4000 fs² achievable without SF57, the pulse broadening of about 4.2 ps achieved thereby and the pulse intensity increased by the factor 5 are obtained.

Various compressor designs which, according to the invention, are tailored to the pulse stretching which has taken place inside the cavity are available for the pulse compression. A Treacy compressor as a suitable design for subsequent pulse compression for such a compact embodiment is described, for example, in Agrawal, G. P., Nonlinear Fiber Optics, Academic Press 1989, page 150.

With an optical length $L_{opt}$ between the gratings of the compressor or an optical length as the distance between the repeated use of the same grating, and the grating constant $\Gamma$ with $d=1/\Gamma$, $$\beta_2 = \frac{\lambda^3 \cdot L_{opt}}{2\pi \cdot c^2 \cdot d^2 \cdot \cos^2 \Theta}$$ (11)

$$\Theta = a\sin\left[\frac{\sin(\gamma) \cdot d - \lambda}{d}\right]$$

where $\Theta$ is the angle between the normal and the incident beam on the grating and $\gamma$ is the angle of incidence on the grating.

For the above values of $\beta_2 = 20\,000$ fs² and 80 cycles, a dispersion of $$\beta_2^{Compr} = 80 \cdot 20000 \text{ fs}^2 = -1.6 \text{ ps}^2$$ (12)

must be achieved. From this it follows for the optical length:

$$L_{opt} = \frac{\beta_2 \cdot \pi \cdot c^2 \cdot d^2 \cdot \cos^2 \Theta}{\lambda^3}$$ (13)

where $$d = \frac{1}{\Gamma} = \frac{1}{1200 \cdot l/\text{mm}}$$

$$\lambda = 1.04 \, \mu\text{m}$$

$$\gamma = 50°$$

$$\Theta = 28.8°$$

$$\Rightarrow L_{opt} = 217 \text{ mm}$$

In order to obtain or maintain a dynamic stability of the laser system according to the invention, a laser medium having a long lifetime $\tau_L$ of the upper level is used.

In general, an approach described in U.S. 60/474,250 can be chosen for calculating the dynamic stability which approach is hereby considered as being fully incorporated in this application. The numerical solution of a system of differential equations describing the system for two materials having different values for $\tau_L$ leads to the following results:

|  | Long lifetime $\tau_L$ | Short lifetime $\tau_L$ |
| --- | --- | --- |
| λ | 1040 nm | 1040 nm |
| σ | $1 \cdot 10^{-24}$ m$^2$ | $125 \cdot 10^{-24}$ m$^2$ |
| $\omega_{gain}$ | 75 μm | 75 μm |
| $T_L$ | 2000 μs | 100 μs |
| $g_0$ | 0.262 | 1.64 |
| $T_R$ | 13.33 ns | 13.33 ns |
| l | 2% | 2% |
| $E_{Seed}$ | 0.5 nJ | 0.5 nJ |
| $E_{Saturation}$ | 3.4 mJ | 27 μJ |

For both lifetimes, the output energies were calculated as a function of the frequency of the regenerative amplifier for a range of relevant gate lengths.

Consequently, a highly repetitive, compact laser system which has stable behaviour even in ranges above 250 kHz and whose components are not subjected to destruction by excessively high intensity can be realised by the choice and tailoring according to the invention of diode-pumped laser medium, intra-cavity pulse stretcher, extra-cavity compressor and electro-optical instead of acousto-optical switching element.

Laser systems according to the invention are described in more detail purely by way of example below with reference to working examples shown schematically in the drawing. Specifically, FIG. 1 shows the diagram of the cavity of a laser system according to the principle of the regenerative amplifier according to the prior art;

Figure 1:
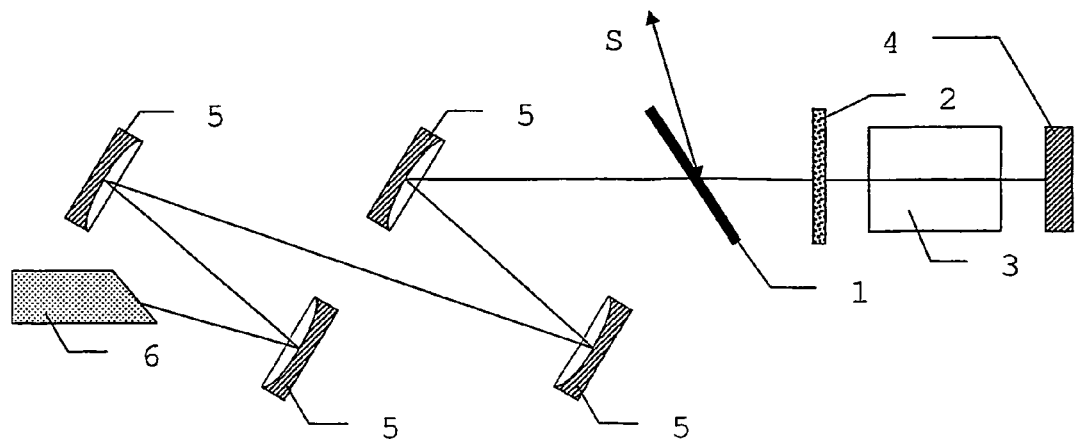

FIG. 1 shows the cavity with the system components of the generic type for a laser system according to the principle of the regenerative amplifier according to the prior art. A polarized seed laser pulse from a seed laser source is input via a polarizer 1 into the arrangement and is reflected by a mirror 4 after passing through an electro-optical modulator 3, such as, for example, a Pockels cell, and a quarter-wave plate 2. Depending on the voltage applied to the electro-optical modulator 3, the polarization plane of the laser beam is rotated so that the polarizer 1 can be passed. By appropriate switching, it is thus possible both to input pulses into the arrangement and to output them as laser pulse S. The electro-optical modulator 3, together with the polarizer 1, thus forms an externally controllable switch by means of which a laser pulse can be alternatively input and output and the resonator quality can be controlled. If a pulse is input and hence trapped within the resonator, it is amplified by the laser medium 6 in each pass, multiple reflections taking place at folding mirrors 5. The laser medium 6 is optically pumped by an external laser diode source which is not shown here. After a certain number of resonator cycles and passes through the amplifying laser beam 6, the pulse is output as laser pulse S via the polarizer 1 by a further rotation of the polarization by switching the electro-optical modulator 3. This arrangement represents only one example of a restorable or regenerative amplifier.

Figure 2:
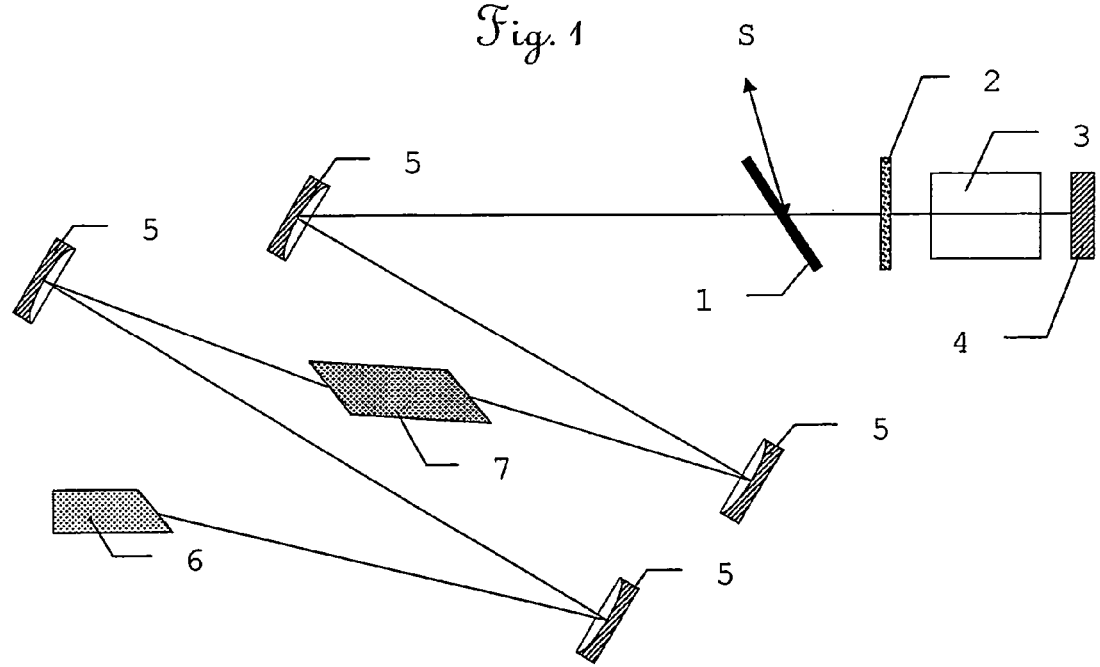
FIG. 2 shows the diagram of the cavity of a first embodiment of the laser system according to the invention.

In FIG. 2, the cavity of the first embodiment of the laser system according to the invention, shown in FIG. 1, is modified by introducing a dispersion-influencing element as pulse stretcher 7. In this example, a pulse stretcher 7 which is in the form of a block of glass of the type SF57 is introduced into the beam path between two folding mirrors 5. In order to achieve as far as possible loss-free input into the pulse stretcher 7, the latter is formed with two Brewster windows. According to the invention, however, other elements of other materials with other shapes or in other positions can also be used. Thus, for example, Gires-Tournois interferometers or dispersive layer structures can be positioned instead of one of the folding mirrors 5 in addition to or as an alternative to the pulse stretcher 7 comprising a dispersive glass block. Furthermore, the glass block can be formed with a reflective side so that it simultaneously performs the function of a folding mirror 5. A further possible design is given by the multiple reflection in the interior of the glass block or of another dispersive medium, which can take place at a reflective surface or at the interface with the air.

Figure 3:
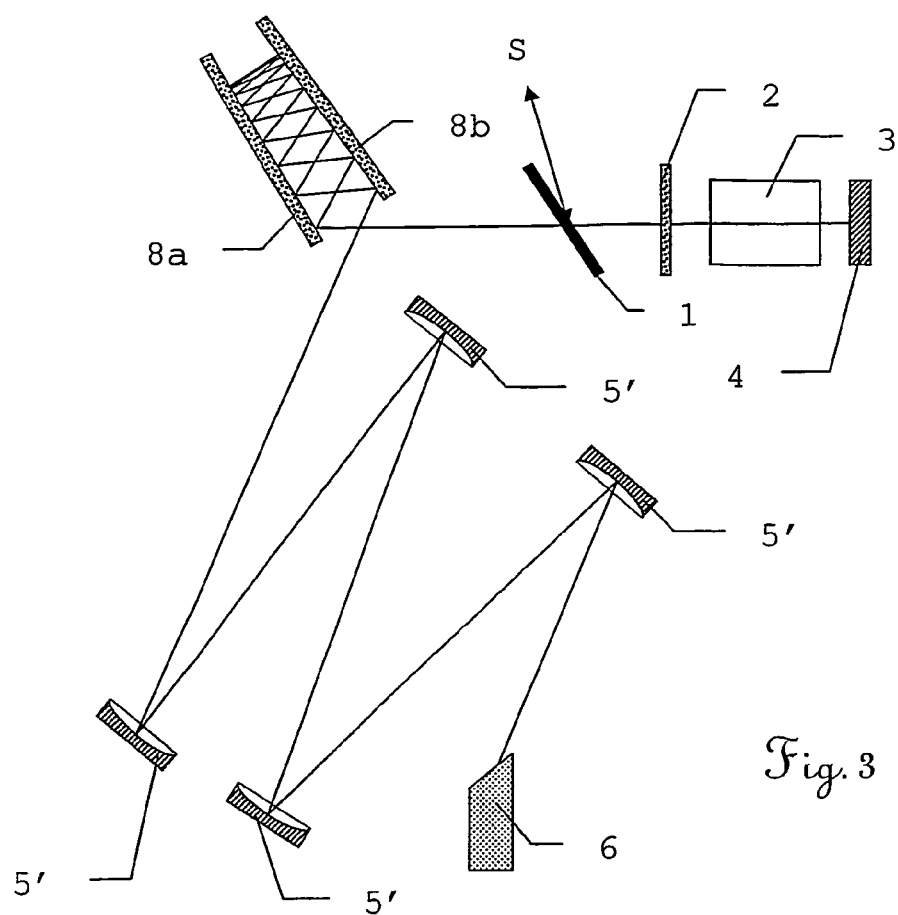
FIG. 3 shows the diagram of the cavity of a second embodiment of the laser system according to the invention.

FIG. 3 shows the diagram of the cavity of a second embodiment of the laser system according to the invention. The basic principle corresponds to the design of a regenerative amplifier, shown in FIG. 1. A polarized seed laser pulse is input via a polarizer 1 into the arrangement comprising quarter-wave plate 2, electro-optical modulator 3 and mirror 4. The cavity is now defined by folding mirror 5' and a laser medium 6' in an arrangement modified compared with FIG. 1 or FIG. 2. A combination of two reflective elements 8a and 8b having dispersive properties is used as a pulse stretcher, the surfaces being slightly inclined relative to one another so that an incident pulse is multiply reflected and thus fed several times to the elements 8a and 8b having dispersive properties. In addition to general folding of the beam path in the cavity frequent interaction with the dispersive elements 8a and 8b and hence corresponding pulse stretching can be achieved thereby even during a single cycle. If the angle between the reflective surfaces of the elements 8a and 8b is designed so as to be adjustable or the angle of incidence is changed, for example by means of an adjustable input mirror, the dispersion achievable per cycle and hence the pulse stretching can also be varied by means of the number of reflections. Here, merely for the sake of simplicity, the pulse stretcher is shown in a simple variant comprising the two elements 8a and 8b. Both the pulse stretcher and an optical system possibly used for input into the pulse stretcher can, however, also be supplemented by further elements for beam guidance. Likewise, the pulse stretcher may also be in the form of a monolithic element in which reflection takes place at interfaces inclined relative to one another. The dispersive effect can then be achieved by the medium and/or by an optionally applied reflective layer. A concept suitable for realising such a pulse stretcher with multiple reflections and associated embodiments are described in U.S. 60/442,917. This document is hereby considered as being incorporated in this Application by reference.

Figure 4:
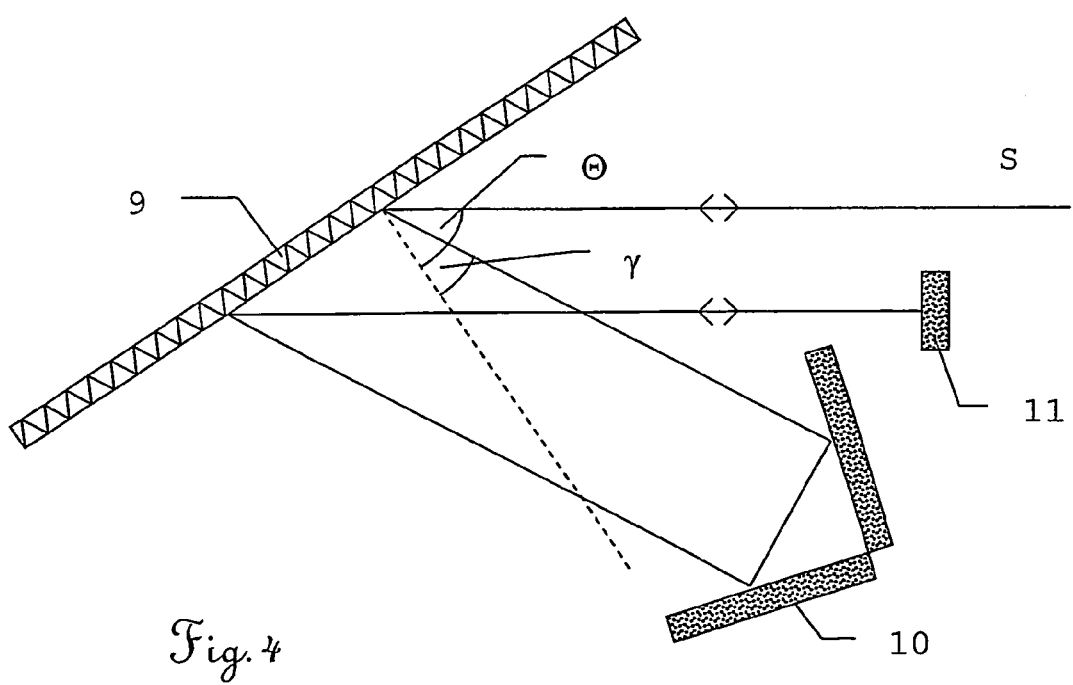
FIG. 4 shows the diagram of a pulse compressor for a laser system according to the invention.

In FIG. 4, a pulse compressor according to the Treacy design for a laser system according to the invention is explained. The laser pulse S output from the regenerative amplifier is fed to a grating 9, for example having less than 1700 lines/mm, preferably about 1200 lines/mm, and is fed from there via a reflector 10 having two right-angled mirror surfaces back to the grating 9 and from there to a back-reflecting mirror 11. Beam reversal is effected by this mirror 11 so that the laser pulse S leaves the compressor along the same path after interaction with the grating a total of four times in this example. In this embodiment, the laser pulse is incident, for example, at an angle γ of 50° relative to the normal to the surface of the grating and is reflected at an angle Θ of 28.8°. The optical length between two consecutive grating reflections, which is relevant for the compression, is only about 217 mm, as shown in the above example calculation.

Figure 5:
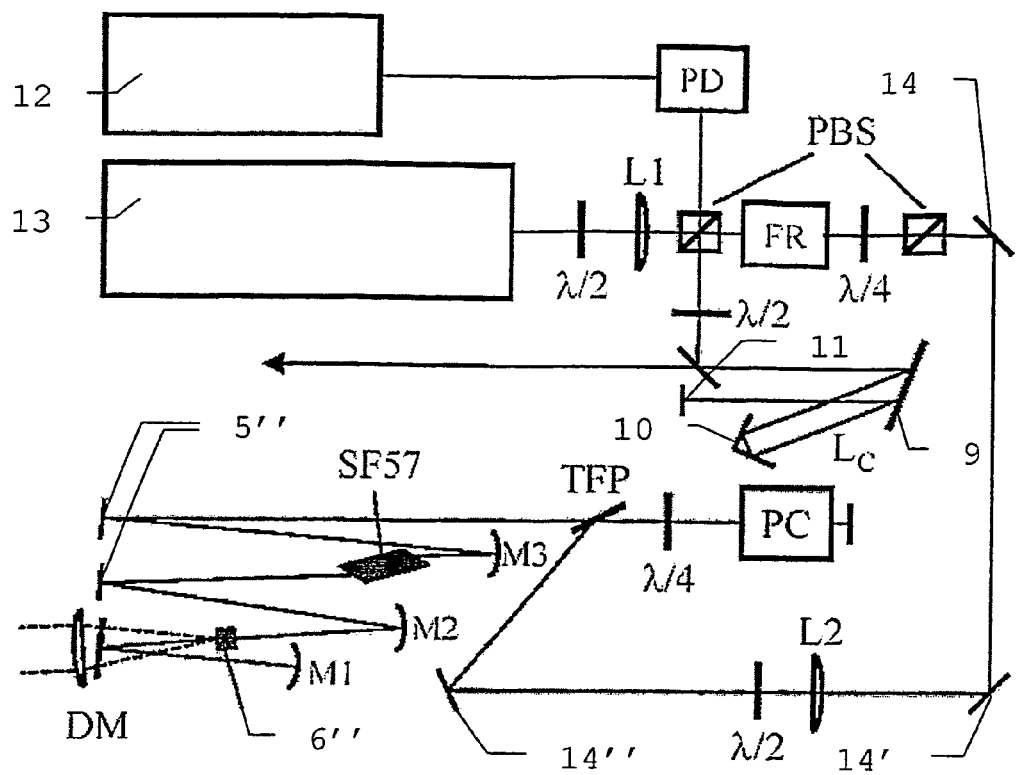
FIG. 5 shows the diagram of the total arrangement of the first embodiment of the laser system according to the invention.
Figure 6:
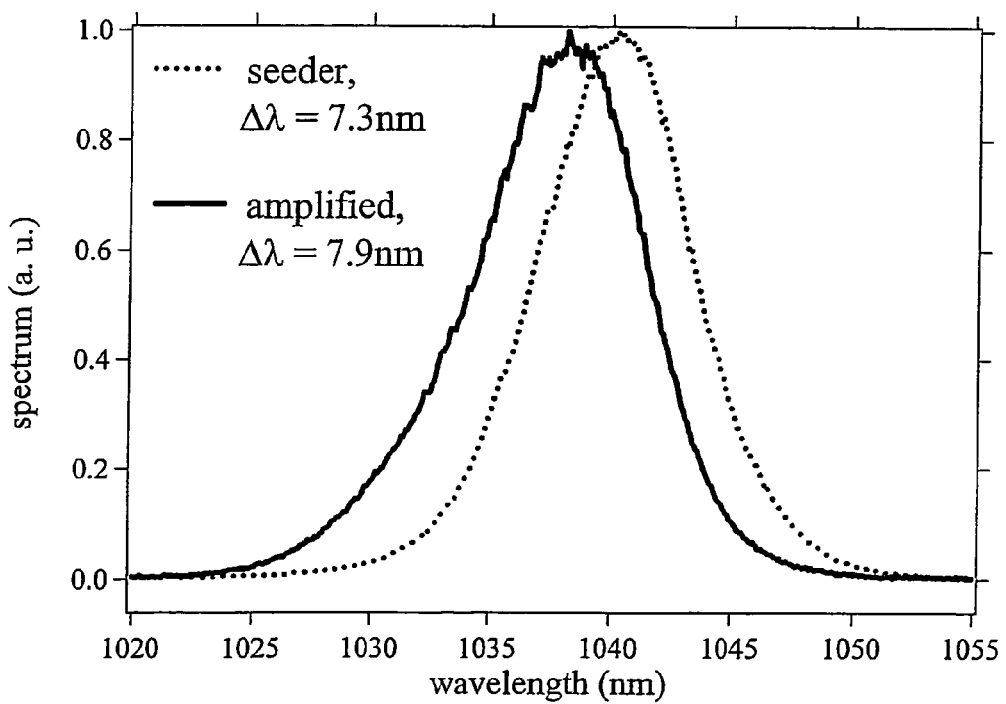
FIG. 6 shows the diagram of the optical spectra of seed pulse and amplified pulse for the first embodiment of a laser system according to the invention.

FIG. 5 shows the schematic diagram of the total arrangement of the first embodiment of the laser system according to the invention. In addition to the cavity design already explained the further components for generating and inputting seed pulses and for subsequent pulse compression are shown. The individual components are designated as follows:
6" Laser medium
9 Grating
10 Reflector
11 Mirror
12 Pulse delay generator and high-voltage supply for the Pockels cell
13 Femtosecond pulse oscillator, 150 fs, 80 MHz, 250 mW power, 1040 nm wavelength
14 Mirror
14' Mirror
14" Mirror
PD Photo diode
PC Pockels cell
PBS Polarizer
TFP Thin-film polarizer
M1 Curved mirror
M2 Curved mirror
M3 Curved mirror
DM Dichroic mirror
L1 Mode-matching lens
L2 Mode-matching lens
$L_c$ Optical length between the grating reflections
FR Faraday rotator
λ/2 Half-wave plate
λ/4 Quarter-wave plate FIG. 6 shows the optical spectra of seed pulse and amplified pulse for the first embodiment of a laser system according to the invention.

Figure 7:
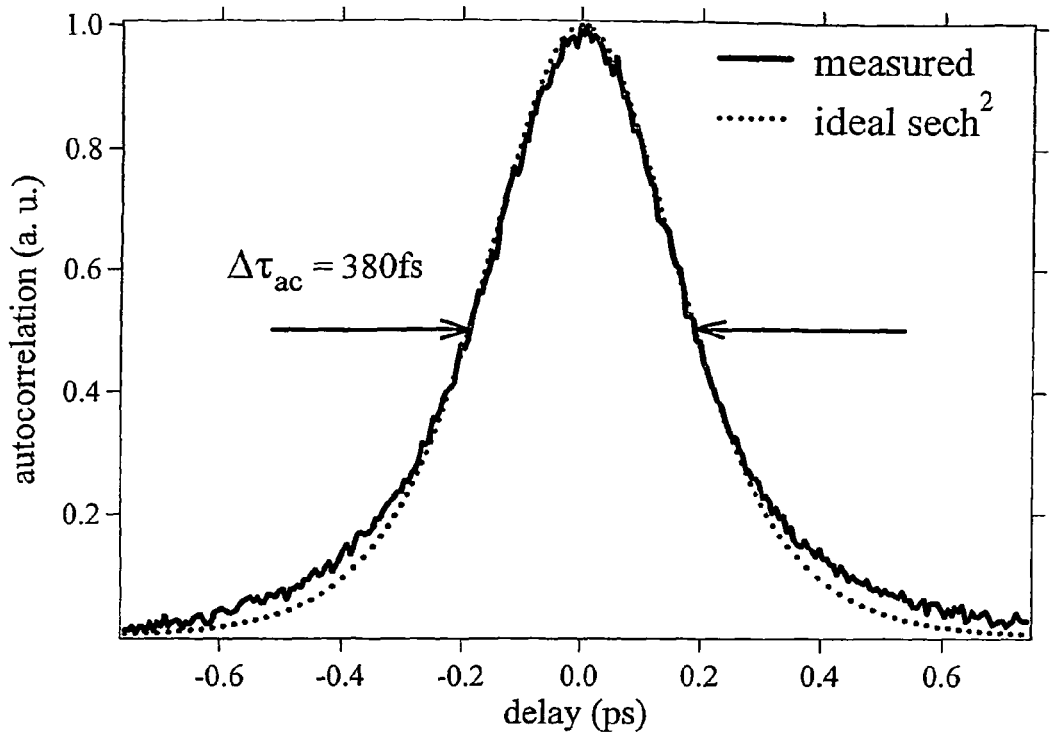
FIG. 7 shows the diagram of the measured autocorrelation of the amplified pulses in comparison with a calculated autocorrelation of ideal pulses for the first embodiment of a laser system according to the invention.

FIG. 7 shows the diagram of the measured autocorrelation of the amplified pulses in comparison with a calculated autocorrelation of ideal pulses for the first embodiment of a laser system according to the invention.

Figure 8:
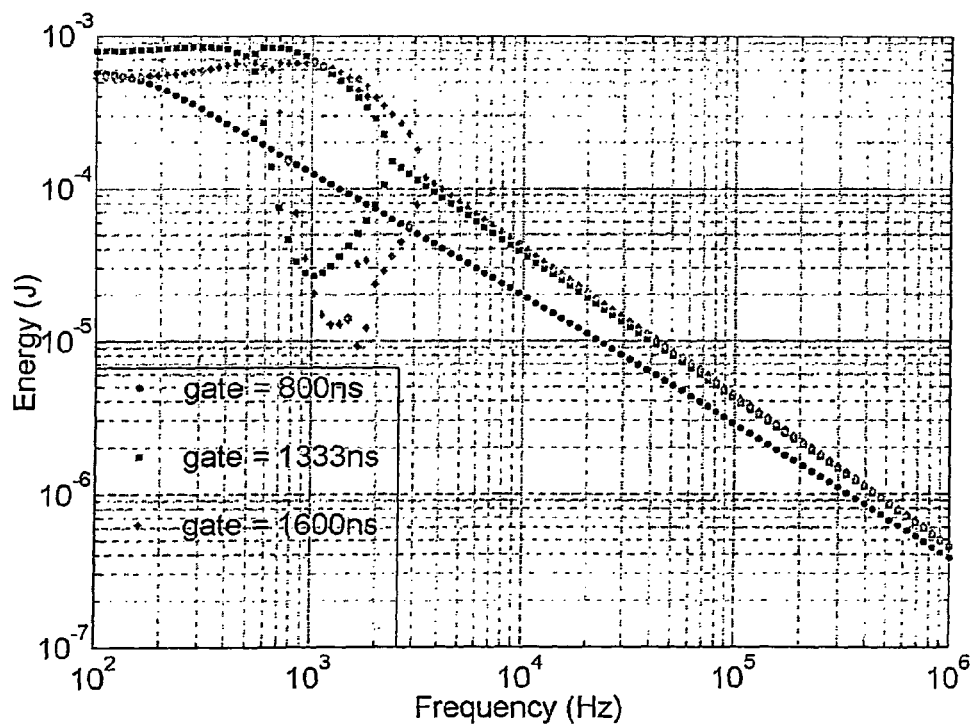
FIG. 8 shows the diagram of calculated results for the stability of the emitted energy as a function of gate length and repetition rate for a storage time of 2 ms and FIG. 9 shows the diagram of calculated results for the stability of the emitted energy as a function of gate length and repetition rate for a storage time of 100 μs.

FIG. 8 shows the diagram of calculated results for the stability of the emitted energy as a function of gate length and repetition rate for a storage time of 2 ms.

Figure 9:
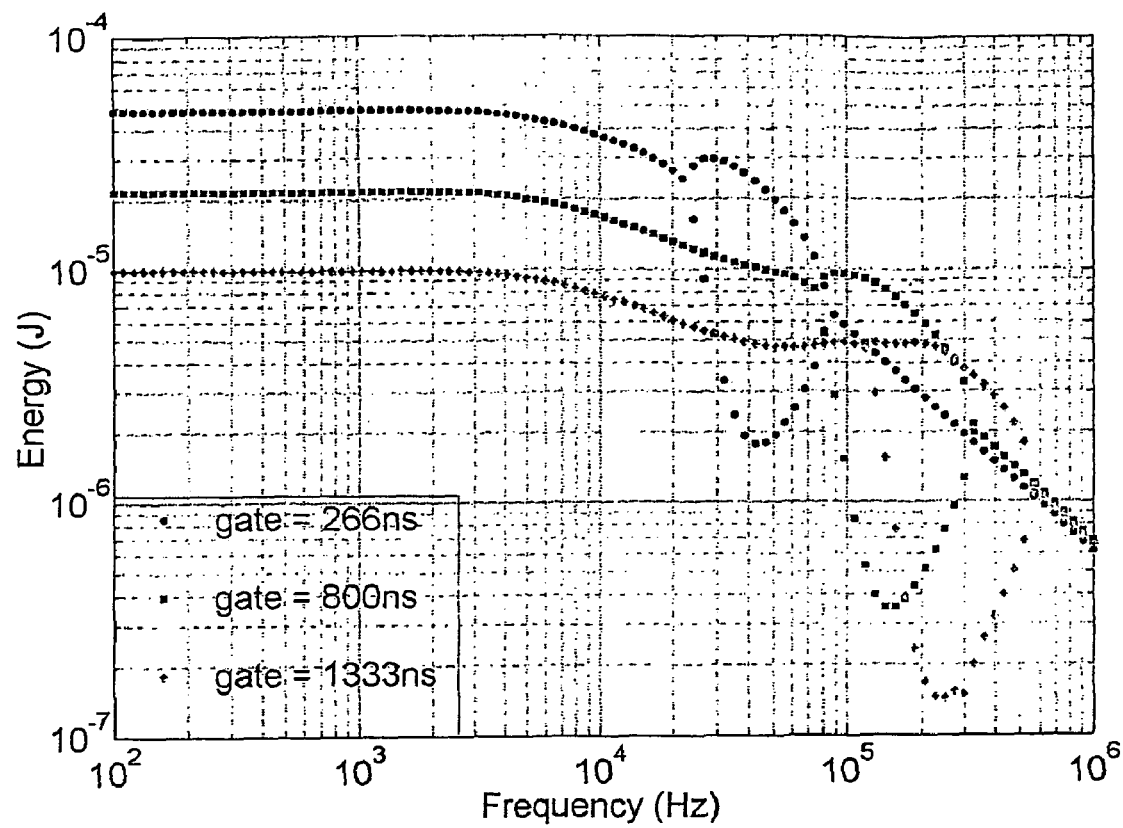

FIG. 9 shows the diagram of calculated results for the stability of the emitted energy as a function of gate length and repetition rate for a storage time of 100 μs.

FIG. 8 and FIG. 9 show the occurring of dynamic instabilities in the form of bifurcations for certain parameter configurations of emitted energy, repetition rate and gate length. By a suitable choice of parameter combinations, such as, for example, gate length and frequency, instabilities can be avoided according to the invention and also highly repetitive laser systems can be operated in a stable manner. Suitable methods and devices for suppressing unstable behaviour are described in PCT/EP2004/005812.

The invention claimed is:

1. Laser system according to the principle of the regenerative amplifier, comprising:
an amplifying laser medium,
a laser resonator having at least one resonator mirror and at least one modulator, and
a pump source for pumping the laser medium,
wherein the laser resonator is designed to operate with a repetition rate of greater than 50 kHz and has a pulse stretcher, inside a cavity of the resonator, as a specially designed component, the pulse stretcher having at least one of a structure- or material-related dispersive effect, the pulse stretcher having a minimum $3^{rd}$ order dispersion with a maximum $2^{nd}$ order dispersion.

2. Laser system according to claim 1, wherein the pulse stretcher has a block of highly dispersive material.

3. Laser system according to claim 2, wherein multiple reflections takes place within the block by reflections at interfaces.

4. Laser system according to claim 1, wherein the pulse stretcher has a Gires-Tournois interferometer or a dispersive layer structure.

5. Laser system according to claim 4, wherein the pulse stretcher has at least two reflecting surfaces, the surfaces being arranged in such a way that the surfaces are oriented
relative to one another and
at an opening angle
and the laser beam is reflected at least twice at at least one of the surfaces.

6. Laser system according to claim 1, wherein the laser medium has an inversion life time greater than 1 ms.

7. Laser system according to claim 1, wherein a femtosecond oscillator for inputting seed pulses, the femtosecond oscillator being formed and arranged in such a way that the seed pulses are femtosecond pulses or picosecond pulses on input into the laser resonator.

8. Laser system according to claim 1, wherein an electro-optical switching element as modulator.

9. Laser system according to claim 1, wherein a pulse compressor is outside the laser resonator.

10. Laser system according to claim 9, wherein the pulse compressor has a dispersive grating having less than 1700 lines/mm.

11. Laser system according to claim 1, wherein the pump source is a laser diode.

12. Laser system according to claim 2, wherein the highly dispersive material is at least one of a SF57 glass, SF10 glass or BK7 glass.

13. Laser system according to claim 5, wherein the opening angle is adjustable.

14. Laser system according to claim 6, wherein the laser medium is a Yb:glass or a Yb:crystal.

15. Laser system according to claim 9, wherein the pulse compressor has a dispersive grating having less than 1200 lines/mm.

16. Laser system according to claim 4, wherein the dispersive layer structure is used as a folding mirror.

17. Laser system according to claim 9, wherein a relationship of the pulse compressor outside the laser resonator is according to a Treacy design.

\* \* \* \* \*